United States Patent
Boyd et al.

(10) Patent No.: US 6,966,960 B2
(45) Date of Patent: Nov. 22, 2005

(54) FUSIBLE WATER-SOLUBLE FILMS FOR FABRICATING THREE-DIMENSIONAL OBJECTS

(75) Inventors: Melissa D. Boyd, Corvallis, OR (US); Darrel H. Cummings, Corvallis, OR (US); Laura Kramer, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 322 days.

(21) Appl. No.: 10/434,313

(22) Filed: May 7, 2003

(65) Prior Publication Data

US 2004/0224173 A1    Nov. 11, 2004

(51) Int. Cl.⁷ .............................. B32B 31/00
(52) U.S. Cl. .................... 156/155; 156/290; 156/308.4
(58) Field of Search ................ 156/155, 290, 156/297, 308.4, 309.6; 264/497, 494

(56) References Cited

U.S. PATENT DOCUMENTS

| | | |
|---|---|---|
| 4,247,508 A | 1/1981 | Housholder |
| 4,705,584 A | 11/1987 | Lauchenauer |
| 4,863,538 A | 9/1989 | Deckard |
| 5,126,529 A | 6/1992 | Weiss et al. |
| 5,136,515 A | 8/1992 | Helinski |
| 5,192,559 A | 3/1993 | Hull et al. |
| 5,204,055 A | 4/1993 | Sachs et al. |
| 5,260,009 A | 11/1993 | Penn |
| 5,263,130 A | 11/1993 | Pomerantz et al. |
| 5,286,573 A | 2/1994 | Prinz et al. |
| 5,301,415 A | 4/1994 | Prinz et al. |
| 5,340,656 A | 8/1994 | Sachs et al. |
| 5,354,414 A | 10/1994 | Feygin |
| 5,386,500 A | 1/1995 | Pomerantz et al. |
| 5,387,380 A | 2/1995 | Cima et al. |
| 5,503,785 A | 4/1996 | Crump et al. |
| 5,555,481 A | 9/1996 | Rock et al. |
| 5,578,155 A | 11/1996 | Kawaguchi |
| 5,593,531 A | 1/1997 | Penn |
| 5,637,169 A | 6/1997 | Hull et al. |
| 5,730,817 A | 3/1998 | Feygin et al. |
| 5,876,550 A | 3/1999 | Feygin et al. |
| 6,056,843 A | 5/2000 | Morita et al. |
| 6,103,176 A | 8/2000 | Nguyen et al. |
| 6,165,406 A | 12/2000 | Jang et al. |
| 6,214,279 B1 | 4/2001 | Yang et al. |
| 6,322,728 B1 | 11/2001 | Brodkin et al. |
| 6,376,148 B1 | 4/2002 | Liu et al. |
| 6,401,002 B1 | 6/2002 | Jang et al. |
| 6,417,248 B1 | 7/2002 | Gore |

(Continued)

FOREIGN PATENT DOCUMENTS

EP     1226975 A2    7/2002

(Continued)

Primary Examiner—Jeff H. Aftergut

(57) ABSTRACT

A material for use in fabricating three-dimensional objects includes a mixture of thermoplastic particles and a water-soluble polymer matrix formed as a film that is fusible into a non-water soluble state when exposed to heating. The film further includes a surfactant system bound to the thermoplastic particles, the surfactant system providing an inversion property such that the thermoplastic particles are hydrophilic but, upon a fusing of the film, become hydrophobic as the surfactant become incorporated into the bulk.

15 Claims, 3 Drawing Sheets

U.S. PATENT DOCUMENTS

2002/0016387 A1    2/2002    Shen
2002/0025411 A1    2/2002    Chung
2002/0033548 A1    3/2002    Brodkin et al.
2002/0062909 A1    5/2002    Jang et al.
2002/0065197 A1    5/2002    Liang et al.
2002/0093115 A1    7/2002    Jang et al.
2002/0113331 A1    8/2002    Zhang et al.
2002/0145213 A1    10/2002   Liu et al.
2002/0149137 A1    10/2002   Jang et al.

FOREIGN PATENT DOCUMENTS

| EP | 1227136 A1 | 7/2002 |
| JP | 9-234799 A * | 9/1997 |
| WO | WO97/39903 A1 | 10/1997 |
| WO | WO98/22250 A1 | 5/1998 |
| WO | WO 99/23126 | 4/1999 |

* cited by examiner

FUSIBLE WATER-SOLUBLE FILMS FOR FABRICATING THREE-DIMENSIONAL OBJECTS

BACKGROUND OF THE INVENTION

Three-dimensional (3D) object fabrication techniques, such as solid freeform fabrication (SFF), allow a 3D object to be built layer-by-layer or point-by-point without using a pre-shaped tool (die or mold). Typically, data representing the geometry or shape of an object to be fabricated are used to control a fabrication tool to build the object.

Solid Freeform Fabrication (SFF) is a general term for using one of several technologies to create three-dimensional objects such as prototype parts, models, and working tools. Solid freeform fabrication is, for example, an additive process in which an object, which is described by computer readable data, is automatically built, usually layer-by-layer, from base materials.

Several principal forms of solid freeform fabrication involve a liquid ejection process. There are two main types of solid freeform fabrication that use liquid-ejection: binder-jetting systems and bulk jetting systems.

Binder-jetting systems create objects by ejecting a binder onto a flat bed of powdered build material. Each powder layer may be dispensed or spread as a dry powder or a slurry. Wherever the binder is selectively ejected into the powder layer, the powder is bound into a cross section or layer of the object being formed.

Bulk-jetting systems generate objects by ejecting a solidifiable build material and a solidifiable support material on a platform. The support material, which is temporary in nature, is dispensed to enable overhangs in the object and can be of the same or different material from the object.

In both cases, fabrication is typically performed layer-by-layer, with each layer representing another cross section of the final desired object. Adjacent layers are adhered to one another in a predetermined pattern to build up the desired object.

In addition to selectively forming each layer of the desired object, solid freeform fabrication systems can provide a color or color pattern on each layer of the object. In binder-jetting systems, the binder may be colored such that the functions of binding and coloring are integrated. In bulk-jetting systems, the build material may be colored.

Inkjet technology can be employed in which a number of differently colored inks are selectively ejected from the nozzles of a liquid ejection apparatus and blended on the build material to provide a full spectrum of colors. Often, the liquid ejection apparatus consists of multiple printheads, each ejecting a different base-colored binder or build material, such as cyan, magenta, yellow, black, and/or clear. On each individual layer, conventional two-dimensional multi-pass color techniques and half-toning algorithms can be used to hide defects and achieve a broad range of desired color hues.

However, most 3D printing technologies do not have color capability due to the technical challenges involved. Even in those cases where it is technically possible, producing full-color parts adds considerable expense.

Today, 3D digital fabrication (Rapid Prototyping) is primarily used by design engineers. These engineers typically use service bureau technology, such as stereolithography, to make rapid prototypes of their designs. Three-dimensional Rapid Prototyping equipment, as it now exists, costs $30,000 to $3,000,000 and can be expensive and complicated to operate. In addition, due to the messes, odors and noise that typically accompany known 3D digital fabrication processes, these machines are not appropriate for use in most office or home environments. Current market solutions to reduce costs have resulted in machines that are extremely slow, or processes that are complex and messy.

Laminated Object Manufacturing, a particular type of 3D digital fabrication, has additional disadvantages including the difficult removal of the excess build material which surrounds the created 3D object. In Laminated Object Manufacturing, excess build material is typically removed by slicing it into small cubes so it can be manually broken loose from the object surface. This process does not work well on partially-enclosed areas, and the material does not separate from horizontal parting lines.

Thus, it would be useful to be able to provide inexpensive 3D object fabrication devices, processes and materials that are suitable for both office and home environments. In particular, it would be helpful to be able to provide input materials to such devices while avoiding the safety hazards or cleanliness issues associated with the powders and liquids that are processed by many current machines. It would also be helpful to be able to provide the ability to remove excess unbonded material and/or materials from recessed and complex shapes without having to use dangerous chemicals.

It would also be helpful if such fabrication devices were as accessible and compact in size as a desktop printer. Moreover, it would be useful and cost effective if such devices included inexpensive and readily available components. It would also be desirable if such devices could operate significantly faster than current low-cost systems, e.g., current systems that rely on a single dispense nozzle.

It would also be useful to be able to provide a 3D object fabrication device that accommodates a variety of different types of media, such as media of different types and sizes, media formed from different types of materials, etc.

Additionally, it would be useful to be able to provide 3D object fabrication devices and processes that employ printing methods, such as inkjet printing, to form full-color 3D objects.

BRIEF DESCRIPTION OF THE DRAWINGS

Detailed description of embodiments of the invention will be made with reference to the accompanying drawings.

DETAILED DESCRIPTION

Figure 1:
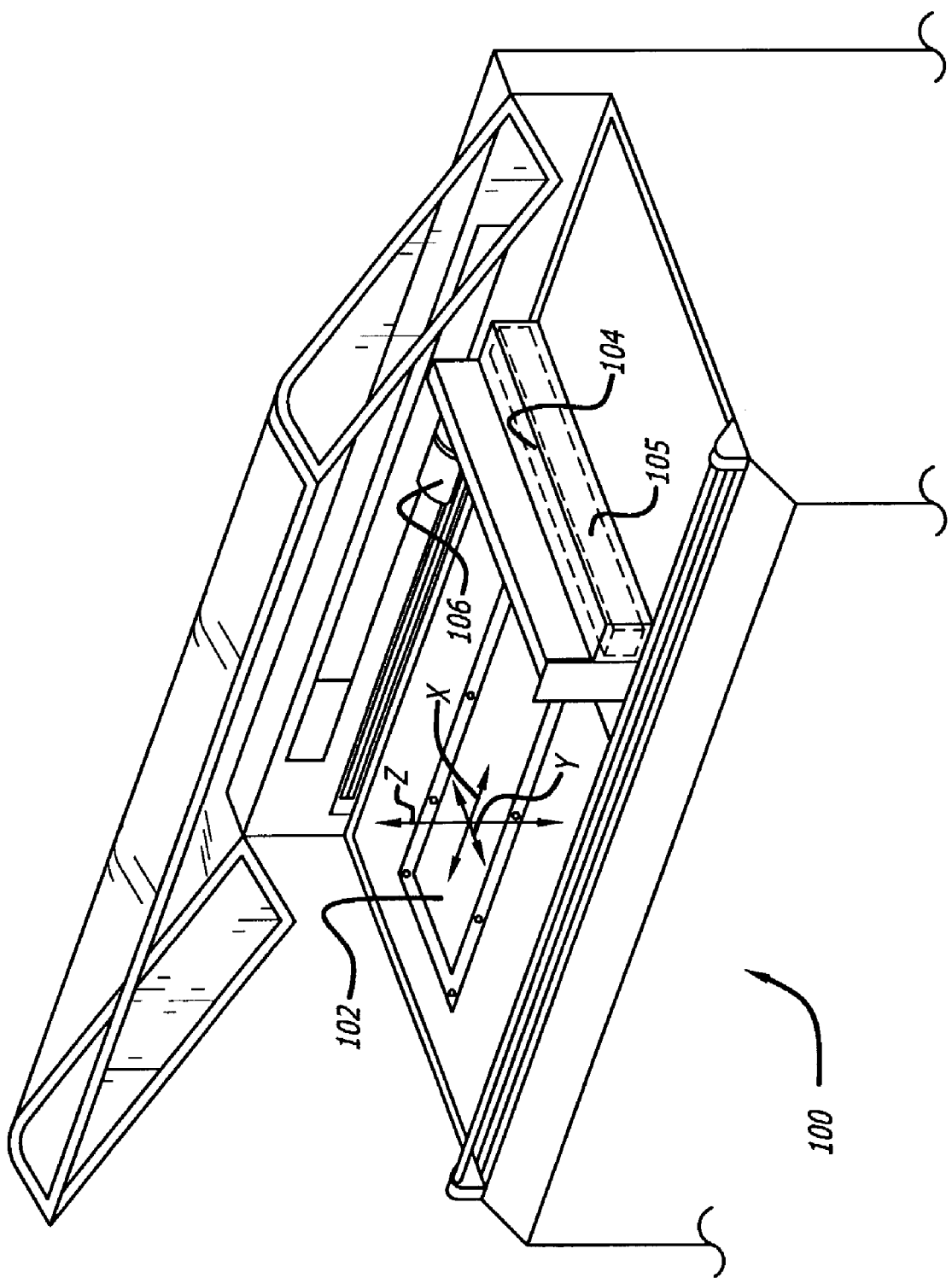
FIG. 1 is a perspective view of a three-dimensional fabricator configured to implement the principles of the present invention.

The following is a detailed description for carrying out the invention. This description is not to be taken in a limiting sense, but is made merely for the purpose of illustrating the general principles of the invention.

According to the present invention, a material for use in fabricating three-dimensional objects is both soluble and fusible into an insoluble state. By way of example, the material is formed as a film that is fusible into a non-water soluble state when exposed to conduction or other heating.

In one embodiment, the film includes a mixture of thermoplastic particles and a water-soluble polymer matrix. In another embodiment, the film further includes a surfactant system bound to the thermoplastic particles. The surfactant system provides an inversion property such that the thermoplastic particles are hydrophilic but, upon a fusing of the film into a bulk, become hydrophobic as the surfactant becomes incorporated into the bulk. In another embodiment, the film further includes a filling or reinforcing material (e.g., glass or carbon fibers, clays, glass beads, metal particles, dispersants, surfactants, etc.). In another embodiment, the film further includes one or more colorant(s). By way of example, the film is water-wettable which permits layers of such film to be printed with a color image using low-cost ink-jet printing methods. As discussed below in greater detail, the ability to provide soluble and fusible colored films facilitates the formation of full-color 3D objects.

With respect to the thermoplastic particles, polymers that are produced by emulsion polymerization can be used for the thermoplastic phase resulting in very small particles (typically 50–500 nm) dispersed in water. Surfactants that can be used to stabilize such polymerizations end up on the surface of the particles and are likely to have a strong effect on how the material behaves in water and when mixed with a matrix polymer, as well as how it fuses. However, it should be appreciated that the thermoplastic does not have to be a hydrophilic material. The fusible films of the present invention can be made from emulsions of polystyrene, polystyrene-co-butyl acrylate (SBA), polymethyl methacrylate-co-butyl acrylate (MBA), for example, as well as from other emulsion polymer compositions and stabilization systems. The thermoplastic particles can also be formed using polymethyl methacrylate (MMA). A discussion of additional materials suitable for forming the thermoplastic particles is included in commonly assigned U.S. Pat. No. 6,417,248 to Gore, which is incorporated herein by reference.

Emulsion polymerization typically involves the polymerization of a hydrophobic monomer stabilized by a surfactant in water. Once the polymer forms, the mixture (colloidal suspension) of polymer particles in water is often referred to as a latex. As a result of the polymerization, the latex particles are coated with the surfactant giving them more hydrophilic properties.

The polymer matrix can include, by way of example, polyvinyl alcohol (PVA) or polyvinyl pyrrolidone (PVP). In another embodiment, the polymer matrix includes a mixture of polyvinyl alcohol (PVA) (molecular weight of ~85,000 g/mol) and pentaerythritol, such as the commercially available material sold under the trade name Sulky Solvy from Sulky of America, 3113 Broadpoint Drive, Punta Gorda, Fla. 33983. Other water soluble polymers can also be used.

The glass transition temperature ($T_g$) of the thermoplastic latex is very important. In various embodiments, the glass transition temperatures are slightly higher than room temperature to avoid premature fusing at room temperature. Also, the glass transition temperature should not be so high that an excessive amount of heat is needed to fuse the material. Thus, by way of example, a glass transition temperature range of about 30° C.–150° C. is appropriate in most instances. More preferably, the glass transition temperature range is about 50° C.–110° C. Materials with glass transition temperatures around 75° C. include SBA and MBA emulsions. Dow, Latex PB 6688ANA BK, based on polystyrene, is a commercially available material with $T_g$~108° C. that can also be used to make films according to the present invention. Thermoplastic latex with glass transition temperatures lower than 30° C., e.g., close to room temperature, can also be used, although they may require more careful processing and handling to avoid premature fusing. Likewise, films formed from thermoplastic latex with glass transition temperatures higher than 150° C. are also within the scope of the present invention.

In an embodiment of the present invention, the film has a composition ranging from approximately 1:1 to 2:1 (thermoplastic:matrix) and a thickness ranging from approximately 10–250 microns (~0.4–10 mils). An exemplary film thickness is around 100 microns (~4 mils). Generally, thinner films provide more layers and greater resolution, whereas thicker films provide for a faster fabrication process, but less resolution. Thus, it should be appreciated that film thickness can be varied within or outside the 10–250 microns range to accommodate different fabrication processes, speed and resolution requirements, etc.

An exemplary media for use in fabricating three-dimensional objects is made from SBA thermoplastic particles mixed with a PVA water soluble binder. The SBA material is prepared as an emulsion in water, with very small particle sizes in the range of 50–500 nm. The SBA solution is mixed with a solution of PVA, with a typical ratio of 2:1 (SBA:PVA) to assure that the SBA encapsulates the PVA upon fusing. The resulting mixture is cast into a film, for example, using a bench-top tape caster (doctor blade), although other casting techniques can also be used. Encapsulated fragments of binder within the final part still provide mechanical stability and contribute to material toughness. In the case of PVA containing binder, the PVA may also crosslink and become insoluble when heated further improving material toughness.

An example of a film formulation according to the present invention is:

10 g thermoplastic particles (typically delivered ~50 weight % in water, so 10 g would require 20 g of this solution)

5 g Sulky Solvy (typically start with ~15 weight % in water, so 5 g would require 33 g of this solution)

1 g colored ink

Further by way example, the above constituents are mixed on rollers for at least 18 hours, and then cast into a film on a polytetraflouethylene (PTFE) coated Kapton support using a bench-top tape caster. After being cast, the films are left to dry at room temperature, typically overnight. Depending upon their fragility, resulting films may or may not require support until they are fused.

Thus, a process for making a film for use in fabricating three-dimensional objects according to an embodiment of the present invention including the steps of: preparing a thermoplastic latex by emulsion polymerization; mixing the latex with a water-soluble polymer (WSP) to form a latex-WSP mixture; casting the latex-WSP mixture into a film; and allowing the film to dry; wherein a composition of the latex-WSP mixture is selected such that portions of the film exposed to a predetermined amount of conduction or other heating fuse into a non-water soluble state and any portions of the film not so exposed remain water-soluble. In another embodiment, the emulsion polymerization is stabilized by a stabilization system (by a surfactant in water).

Referring to FIG. 1, an exemplary SFF tool such as three-dimensional fabricator 100 includes a build bin 102, a heating device 104, and a transport mechanism 106. After each layer of the 3D object is fabricated, the build bin 102 (in which the object sits) is repositioned downward along the z-axis so that the next layer of the object can be formed on top of the previously formed layer. By way of example, the build bin 102 can have dimensions such as 8"×10"×10" or 6"×6"×6" to accommodate fabricators and 3D objects of various sizes. The transport mechanism 106 comprises, by way of example, a motorized transport mechanism which is attached to the heating device 104 and moves in the x axis along a slide bar. The three-dimensional fabricator 100 also includes a controller (not shown) which is programmed to, inter alia, control the aforementioned repositioning of the heating device 104 during the 3D object fabrication process. The controller can take the form of a discrete module positioned proximate to the heating device 104; alternatively, the operations performed by the controller can be distributed among a plurality of controllers, processors or the like, and/or the controller can be remotely located relative to the heating device 104.

The heating device 104 includes, by way of example, a page-wide thermal print bar, a scanning thermal head, or a laser beam. The heating device 104 can take the form of an array of heating elements, such as those found on a thin film thermal printhead or flat type printhead. In various embodiments, the heating device 104 takes the form of a non-laser heating device. Generally, the heating device 104 is configured to applying an amount of conduction or other heating sufficient to fuse desired portions of a first layer of build film that is positioned on the build bin 102 and then to fuse desired portions of subsequent layers of build film, each to the top layer of a stack of previously fused build film layers, during fabrication of a three-dimensional object.

The heating device 104 can also include one or more sensor mechanisms (not shown) for identifying the type of film or other media. Such sensor mechanisms can additionally, or alternatively, be separately located from the heating device 104. Regardless, the one or more sensor mechanisms provide information to the controller that allows the controller to control the amount of conduction or other heating applied by implementing stored protocols, algorithms or the like that are associated with the particular information provided by the sensor(s). For example, an apparatus for fabricating a three-dimensional object according to present invention includes: a mechanism for identifying a type of media (e.g., by size, physical properties, coded information) and for sequentially fusing layers of the media together into a three-dimensional object by applying an amount of conduction or other heating determined in consideration of a characteristic of the type of media (e.g., a glass transition temperature of fusible particles in the media, a ratio of fusible particles to water-soluble materials in the media, a type of fusible particle in the media, a type of water-soluble material in the media); and a build bin configured to support the fused layer(s) during fabrication of the three-dimensional object. Thus, the present invention allows digital fabrication from a variety of different types of media, such as media of different thicknesses, media formed from different types of thermoplastic materials, media formed from different compositions of materials, etc.

In other embodiments, the heating device 104 can be configured to provide the functions of both film fusing and coloring and, in such embodiments, also includes a printer 105 (shown in dashed lines). Integration of these functions can be accomplished, for example, by providing the heating device 104 with a printer 105 including inkjet printing mechanisms. Alternatively, a separate device can be used to color the film before it is provided to the three-dimensional fabricator 100. In either case, each layer of film can be digitally printed with a color image before fusing. Also, as discussed above, the film can be pre-colored (i.e., formed with colorant(s) in the mixture).

Figure 2:
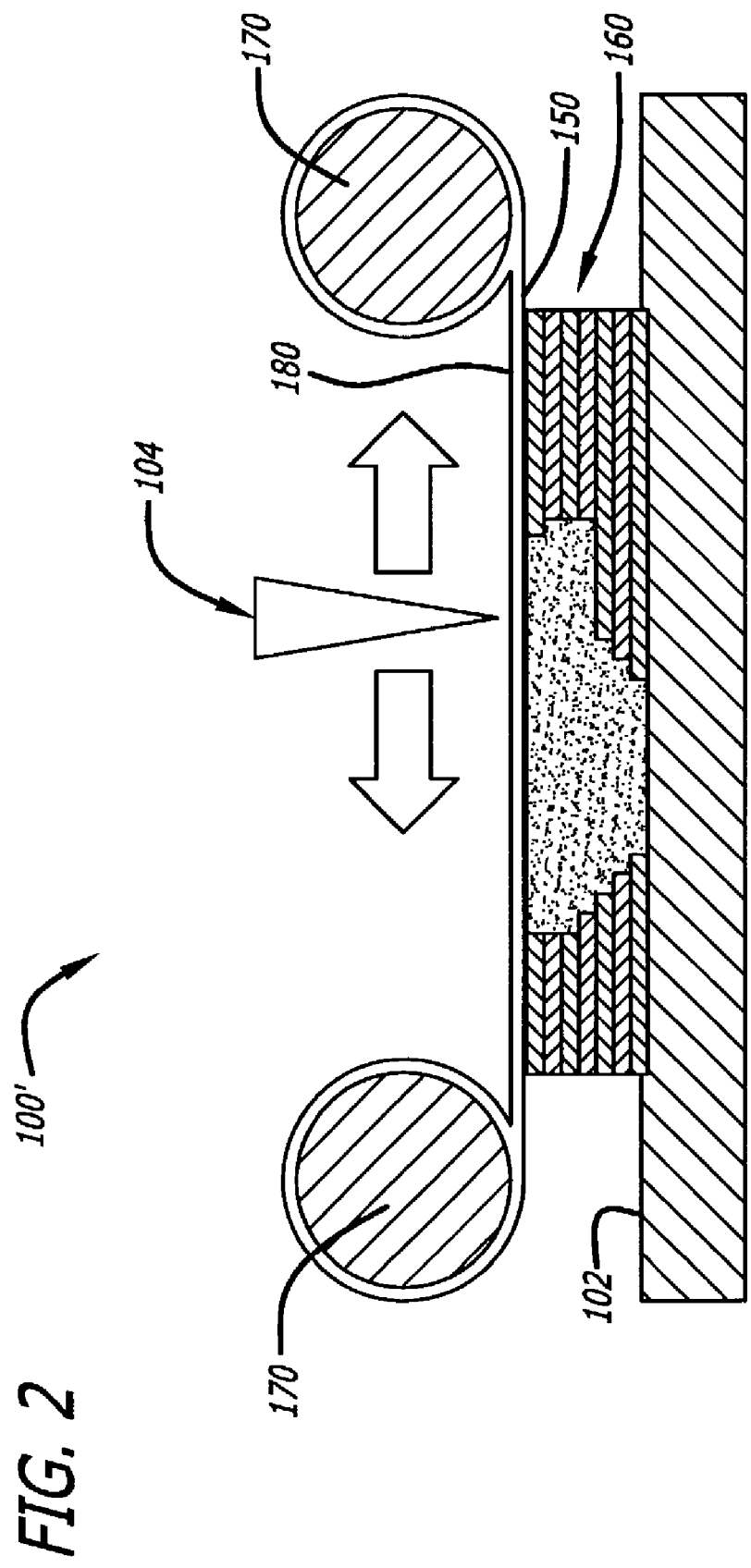
FIG. 2 is a partial cross-sectional view of a three-dimensional fabricator showing a layer of build film being fused to the top layer of a stack of previously fused build film layers during fabrication of a three-dimensional object.

FIG. 2 is a partial cross-sectional view of a three-dimensional fabricator 100' showing a layer of build film 150 being fused to the top layer of a stack 160 of previously fused build film layers during fabrication of a three-dimensional object. In this example, the three-dimensional fabricator 100' includes a media advancing mechanism in the form of one or more roller 170, and the layer of build film 150 and an adjacent release film 180 are delivered from a roll. By way of example, the release film 180 is a polytetraflouethylene (PTFE) coated polyester or PTFE coated polyimide.

According to various embodiments of the present invention, film is delivered from rolls or sheets onto a build area, one layer at a time, and therefore does not create a safety hazard or cleanliness problem as is the case with the powders and liquids of many current machines. After each layer is placed in the build area, it is selectively heated in such a way as to reflow the thermoplastic particles only in the selected areas and bond them to each other and to the sheet below. By varying the selected heated areas in each layer as the build progresses, a three-dimensional object is created in the reflowed area. As discussed above, this selective heating can be accomplished through use of a page-wide thermal print bar moved (e.g., at a steady rate) across the surface of the film, for example, or a scanning thermal head, or a laser beam, etc. Depending upon the nature of the film and the particulars of the object fabrication process, a release film may be required between the heating device and the film. After the build is completed, the stack of bonded films can be removed from the build area and washed with water to dissolve away the unbonded areas of film.

Figure 3A:
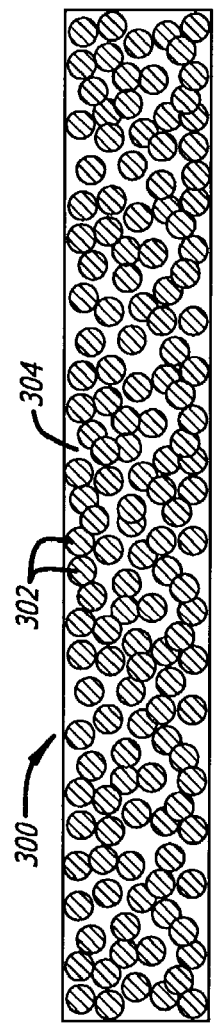
FIGS. 3A–3D illustrate how a portion of a single film layer is fused and how non-fused portions of the film layer are thereafter washed away leaving only the fused portion of the film.
Figure 3B:
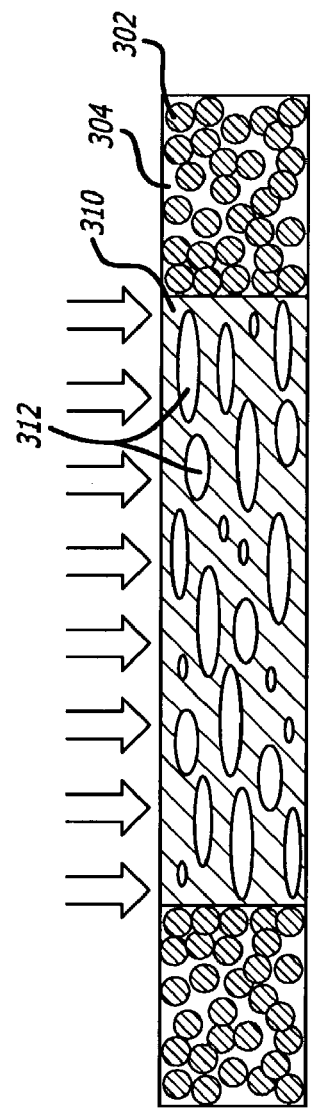
Figure 3C:
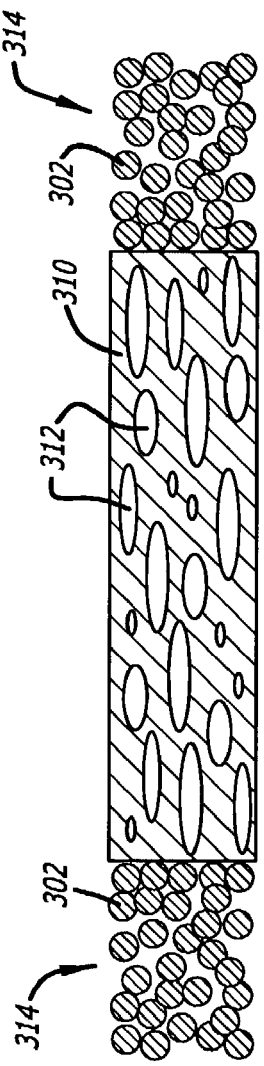
Figure 3D:
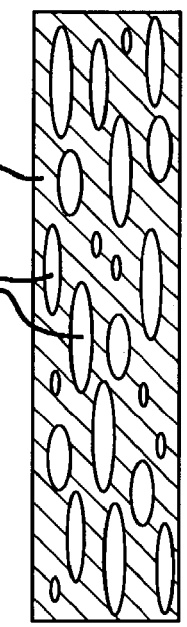

FIGS. 3A–3D illustrate how a portion of a single film layer is fused and how non-fused portions of the film layer are thereafter washed away leaving only the fused portion of the film. Referring to FIG. 3A, a single film layer 300 includes thermoplastic particles 302 held together by a water soluble polymer (WSP) matrix or binder 304. As shown in FIG. 3B, the film 300 fuses in the areas where heat is applied creating a uniform, fused thermoplastic matrix or region 310 within which WSP particles 312 are trapped. In various embodiments, the thermoplastic particles 302 "invert", changing from hydrophilic to hydrophobic, when fused into the thermoplastic matrix 310. The fused thermoplastic region 310 is no longer soluble in water, while the WSP matrix areas 314 that have not been heated can be dissolved by water (FIG. 3C), leaving only the fused portion of the film, i.e., the region 310 within which WSP particles 312 are trapped (FIG. 3D).

By patterning successive layers of film with cross-sectional slices of a solid part, the fused area builds up a three-dimensional object. After the object has been fully defined, the unfused film is washed away with water. As discussed above, full-color objects can be created by printing on each layer of film, e.g., with the printer 105 (FIG. 1), before the selective heating process.

An example method of using a heating device to fabricate a three-dimensional object begins by placing a water-soluble build film (e.g., containing clear thermoplastic particles) on the work area. A thin non-stick release film temporarily covers the surface of the build film. A page-wide thermal print bar is moved across the build area, selectively heating those areas which will become part of the final object. The release film is lifted, a new layer of build film is fed onto the work area, and the process is repeated until the part is complete. The stack of bonded film is removed from the printer, and the unbonded film is washed away with water. The build area can be varied to minimize material waste, by loading a narrower film roll (width) or cutting the film layers to the minimum size required (length) to build the specific part.

In another embodiment, a method of using a heating device to fabricate a three-dimensional object includes the steps of: sequentially delivering layers of a build film and an adjacent release film onto a build area, the build film being a water-soluble composite of thermoplastic particles in a binder material; for each layer, employing a heating device to heat selected areas of the layer, and then lifting its release film before the next layer is delivered to the build area, to reflow the thermoplastic particles in the selected areas and bond the thermoplastic particles to each other and to the layer below to form a three-dimensional object; and washing away unbonded portions of the build film with water to reveal the three-dimensional object. In another embodiment, the build film and release film are delivered from a roll or as sheets. In another embodiment, the build film layers are printed with colorant(s) (e.g., colored ink) before being bonded together. In another embodiment, the release film is a PTFE coated polyester or polyimide.

In another embodiment, an apparatus for fabricating a three-dimensional object includes: a printer with a heating device configured to sequentially fuse layers of media together into a three-dimensional object by applying an amount of conduction or other heating determined in consideration of a glass transition temperature of fusible particles in the media. In another embodiment, the glass transition temperature is about 30° C.–150° C. In another embodiment, the printer includes a build bin configured to support and reposition the fused layer(s) relative to the heating device between the fusing of each layer. In another embodiment, the printer is configured to draw the layers of media from a roll and to sequentially position the layers over the build bin.

In another embodiment, a method of fabricating a three-dimensional object includes the steps of: providing a film that is fusible into a non-water soluble state when exposed to conduction or other heating, the film being a mixture of thermoplastic particles and a water-soluble polymer matrix, the film further including a surfactant system bound to the thermoplastic particles, the surfactant system providing an inversion property such that the thermoplastic particles are hydrophilic but, upon a fusing of the film into a bulk, become hydrophobic as the surfactant become incorporated into the bulk; positioning layers of the film sequentially along a build axis and, for each of the layers before a subsequent layer is positioned, heating areas of the layers that are to be fused together to form a fused three-dimensional object; and dissolving non-fused portions of the layers with water to reveal the fused three-dimensional object. Thus, the present invention facilitates the removal of excess unbonded material (including materials from recessed and complex shapes) by dissolving in water, a process that advantageously does not involve dangerous chemicals. In another embodiment, the step of heating provides an amount of energy to the layers that is a function of a glass transition temperature of the thermoplastic particles. In another embodiment, the step of heating provides an amount of energy to the layers that is a function of a composition of the mixture of the thermoplastic particles and the water-soluble polymer matrix.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method of fabricating a three-dimensional object, the method including the steps of:
providing a film that is fusible into a non-water soluble state when exposed to heating, the film being a mixture of thermoplastic particles and a water-soluble polymer matrix, the film further including a surfactant system bound to the thermoplastic particles, the surfactant system providing an inversion property such that the thermoplastic particles are hydrophilic but, upon a fusing of the film into a bulk, become hydrophobic as the surfactant become incorporated into the bulk;
positioning layers of the film sequentially along a build axis and, for each of the layers before a subsequent layer is positioned, heating areas of the layers that are to be fused together to form a fused three-dimensional object; and
dissolving non-fused portions of the layers with water to reveal the fused three-dimensional object.

2. The method of fabricating a three-dimensional object of claim 1, wherein the step of heating provides an amount of energy to the layers that is a function of a glass transition temperature of the thermoplastic particles.

3. The method of fabricating a three-dimensional object of claim 2, wherein the glass transition temperature is about 30° C.–150° C.

4. The method of fabricating a three-dimensional object of claim 1, wherein the step of heating provides an amount of energy to the layers that is a function of a composition of the mixture of the thermoplastic particles and the water-soluble polymer matrix.

5. The method of fabricating a three-dimensional object of claim 4, wherein the composition ranges from approximately 1:1 to 2:1 (thermoplastic:matrix).

6. The method of fabricating a three-dimensional object of claim 1, wherein the film is water-wettable.

7. The method of fabricating a three-dimensional object of claim 1, wherein the film has a thickness ranging from approximately 10–250 microns.

8. The method of fabricating a three-dimensional object of claim 1, wherein the thermoplastic particles include polystyrene.

9. The method of fabricating a three-dimensional object of claim 1, wherein the thermoplastic particles include polystyrene-co-butyl acrylate (SBA).

10. The method of fabricating a three-dimensional object of claim 1, wherein the thermoplastic particles include polymethyl methacrylate-co-butyl acrylate (MBA).

11. The method of fabricating a three-dimensional object of claim 1, wherein the thermoplastic particles include polymethyl methacrylate ( ).

12. The method of fabricating a three-dimensional object of claim 1, wherein the polymer matrix includes polyvinyl alcohol (PVA).

13. The method of fabricating a three-dimensional object of claim 1, wherein the polymer matrix includes polyvinyl pyrrolidone (PVP).

14. The method of fabricating a three-dimensional object of claim 1, wherein the polymer matrix includes a mixture of polyvinyl alcohol (PVA) and pentaerythritol.

15. The method of fabricating a three-dimensional object of claim 14, wherein the PVA has a molecular weight of ~85,000 g/mol.

* * * * *